(12) United States Patent
Li et al.

(10) Patent No.: US 7,648,969 B2
(45) Date of Patent: Jan. 19, 2010

(54) LOW MOLECULAR WEIGHT CHITOSAN OLIGOSACCHARIDES AND ITS PREPARATION METHOD

(75) Inventors: Pengcheng Li, Shandong (CN); Ronge Xing, Shandong (CN); Song Liu, Shandong (CN); Huahua Yu, Shandong (CN)

(73) Assignee: Institute of Oceanology Chinese Academy of Sciences, Shandong (CN)

( * ) Notice: Subject to any disclaimer, the term of this patent is extended or adjusted under 35 U.S.C. 154(b) by 256 days.

(21) Appl. No.: 10/560,296

(22) PCT Filed: Oct. 8, 2003

(86) PCT No.: PCT/CN03/00847

§ 371 (c)(1),
(2), (4) Date: Dec. 12, 2005

(87) PCT Pub. No.: WO2005/007702

PCT Pub. Date: Jan. 27, 2005

(65) Prior Publication Data

US 2007/0089978 A1   Apr. 26, 2007

(30) Foreign Application Priority Data

Jul. 16, 2003   (CN) ................. 03 1 38817

(51) Int. Cl.
*C08B 37/08* (2006.01)
(52) U.S. Cl. .................. 514/55; 536/20; 204/157.68
(58) Field of Classification Search ............ 204/157.68; 536/20; 514/55
See application file for complete search history.

(56) References Cited

U.S. PATENT DOCUMENTS 4,159,932 A   7/1979 Peniston
4,970,150 A * 11/1990 Yaku et al. .............. 435/101

FOREIGN PATENT DOCUMENTS

| CN | 1210867 |   | 3/1999 |
| CN | 1210867 | A | 3/1999 |
| CN | 1329095 |   | 1/2002 |
| CN | 1329095 | A | 1/2002 |
| CN | 1363612 |   | 8/2002 |
| CN | 1363612 | A | 8/2002 |
| JP | 62182304 | * | 7/1988 |
| JP | 09-031105 |   | 2/1997 |
| JP | 9031105 |   | 2/1997 |
| JP | 63182304 | A * | 7/1997 |

OTHER PUBLICATIONS

Li et al, Chinese Journal of Biochemical Pharmaceutics, 2002, 23(3), 132-33.*
Li et al, Chinese Journal of Biochemical Pharmaceutics, 2002, 23(3), 132-33, English Translation.*
Kolupavev, et al, Fiziologia I Biokhimiya Kul'turnykh Rastenii, 1991, 23(3), 267-74, English Translation.*
PCT International Preliminary Examination Report with English translation (PCT/IPEA/409, PCT/IPEA/416).
"The Rapid Preparation of Water-Soluble Chitosan Under Microwave Radiation", Ding, et al., Chinese Journal of Biochemical Pharmaceutics, vol. 23, No. 3, 2002, pp. 132-133.
Journal of Guangdong University of Technology, vol. 16, No. 1, Mar. 1999, Liang Liang.
Chinese Journal of Biochemical Pharmaceutics, Volu. 23, No. 3, 2002, Ding, Yinghong, et al. "The rapid preparation of water-soluble chitosan under micro wave radiation", pp. 132-133.
Journal of Guangdong University of Technology, vol. 16, No. 1, Mar. 1999, Liang, Liang, et al., "Study on Preparation of Chitosan with Microwave New Technology", pp. 64-65.
PCT International Preliminary Examination Report with English translation (PCT/IPEA/409, PCT/IPEA/416), Nov. 10, 2005.
"Study on the Preparation of Chitosan with Microwave New Technology" Journal of Guangdong University of Technology, vol. 16, No. 1, Mar. 1999, Liang Liang.

* cited by examiner

*Primary Examiner*—Shaojia Anna Jiang
*Assistant Examiner*—Ganapathy Krishnan
(74) *Attorney, Agent, or Firm*—Smith, Gambrell & Russell, LLP

(57) ABSTRACT

The present invention relates to low molecular weight chitosan oligosaccharides and its preparation method. Chitosan oligosaccharides were obtained under microwave irradiation assisted the electrolyte. The method of preparing chitosan oligosaccharides was described as follows: acid solvent containing electrolyte was added to chitosan. The reaction was performed at 480~800 W for 3~12 min. After irradiation ceased, the reaction liquid was cooled to room temperature. Then the solution was adjusted to neutrality with 1~10 M NaOH or KOH and obtained the pale yellow floc. The processes of precipitation, filtering, desiccation and crushing are settled sequentially. Finally, chitosan oligosaccharides were obtained. Method of the present invention makes chitosan degrade to water-soluble chitosan oligosaccharides and it makes some inert substance become active. The method of the present invention can cut down energy consumption, decrease pollution and save time and raw materials. It has applying perspective of industry and potentiality of extensive market.

10 Claims, 3 Drawing Sheets

LOW MOLECULAR WEIGHT CHITOSAN OLIGOSACCHARIDES AND ITS PREPARATION METHOD

FIELD OF THE INVENTION

This invention relates to an amelioration of preparation technique of chitosan oligosaccharides, particularly to microwave degraded to prepare low molecular weight chitosan oligosaccharides and its preparation method, microwave degradation technique was used to prepare chitosan oligosaccharides. The invention is part of Marine-Chemical technique field.

BACKGROUND OF THE INVENTION

It is well known that oligosaccharides have various biological activities such as anticarcinogen, diagnostic reagent, physiologic activities, functional foods, cosmetics and so on. Chitosan oligosaccharides owned distinctly applying perspective against chitin and chitosan such as excellent solubility, no antigenicity, soft build-up effect in host, and so on. However, at present, because of complex prepare technique of chitosan oligosaccharides and dim action principle, their price is very expensive and their large-scale applications are confined. The reason of above-mentioned results is that the preparation technique and action mechanism of chitosan oligosaccharides not were deeply studied yet. Obviously, this result was not coincident with the abundant chitin resource in our country.

It is well known that chitosan oligosaccharides are mainly prepared by degradation of chitin and chitosan. At present, several methods have been suggested for the preparation of chitosan oligosaccharides such as acidic depolymerization, oxidative degradation, supersonic degradation and so on. However, the yield of chitosan oligomers that were degraded by above-mentioned methods was low (about 10~50%). Moreover, molecular weight and yield of the resultant were unstable, that is a bad repeatability by using these methods. Because of low yield, a lot of chitosan was wasted and serious waste of raw material leaded to the higher cost of material. In order to decrease the cost and improve the yield of the resultant, ameliorated preparation technique has become a key problem.

Microwave irradiation technique, a new organic synthesis technique, replaces of the conventional heating methods to apply to organic dry or wet reaction in the late 1980S. Compared with the conventional heating, microwave irradiation has some distinct advantages such as fast reaction, high yield, uniform heat and uniform quality of the resultant. So the methods of microwave irradiation have large-scale application perspectives, for example, in Diels-Alder reaction and its annelation. The principle of microwave dielectric heating, described as "inside heating", is ion migrate or polar molecule rotate makes the molecule motion. So it did not result in the change of inner molecular structure and it quite improved reaction rates and selectivity. Therefore, microwave heating was widely applied to organic dry and wet reaction. It pioneered a new road to some reactions that they are difficult to perform in the way of conventional heating and it made some inert substances become active. However, few people have studied the preparation of chitosan oligosaccharides under microwave irradiation, none on salt-assisted acid hydrolysis preparation under microwave irradiation.

SUMMARY OF THE INVENTION

It is an object of the present invention to provide low molecular weight chitosan oligosaccharides and its preparation method by utilizing rich resources in chitin. The chitosan oligosaccharides have various biological activities. By using the method of present invention, chitosan oligosaccharides can contributes to our society and bring benefit to the people.

The Technical Program of Present Invention is as Follows:

The characteristic structure of chitosan oligosaccharides that was prepared under microwave irradiation assisted the electrolyte is:

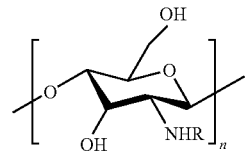

Wherein n=3~150 (degree of polymerization), R=H and/or Ac, Mv=600~30000 Da.

The Prepare Method of the Present Invention is Described as Follows:

1) Weighting quantitative chitosan powder.
2) Adding electrolyte solution (chitosan: electrolyte solvent (W/V)=1:8~30) to the chitosan, then chitosan dissolved to viscous fluid.
3) Stirring viscous fluid to uniform, then after cap sealing to place in the microwave oven with microwave energy control to begin reaction.
4) The solution was adjusted to neutrality with 1~10 M NaOH, KOH or ammonia water and obtained pale yellow floc. Then the floc was settled beyond 30 min at 1~10° C. in cold closet.
5) The pale yellow floc in step 4) was filtered. The precipitate was desiccated at 50~70° C.
6) Dried product was crushed to 20~100 mesh and assayed the molecular weight of chitosan oligosaccharides (molecular weight 600~30000 Da) was taken as the finished product.

In step 2) electrolyte solution was that adding the electrolyte to dilute acid solution formed electrolyte acid solution and electrolyte may be NaCl, KCl, $CaCl_2$ or $FeCl_3$ and so on. Dilute acid may be hydrochloric acid, acetic acid, citric acid, tartaric acid, formic acid and so on. Concentration of tartaric acid and citric acid was 0.5~4% (W/V) and hydrochloric acid, acetic acid and formic acid was 0.5~4% (V/V). In electrolyte acid solution addition of electrolyte was that the ionic strength was 0.01~0.1. In step 3), microwave energy was 480~800 W and reaction time was 1~12 min.

Acid solvent containing NaCl obtained range of molecular weight of the resultant to be $2.5 \times 10^4$~$9.14 \times 10^3$ Da; Acid solvent containing KCl or $CaCl_2$ obtained molecular weight to be $2.0 \times 10^4$~$6.02 \times 10^2$ Da; or $1.8 \times 10^4$~$4.79 \times 10^2$ Da, respectively.

Advantages of the Present Invention:

1) In the present invention, chitosan was degraded by means of microwave irradiation assisted electrolyte and obtained chitosan oligosaccharides with low molecular weight owning various biological activities. Compared with this result, the range of the molecular weight of the degraded resultant was $2.00 \times 10^5$~$5.00 \times 10^5$ Da under microwave irradiation by means of pure acid solvent. The range of the molecular weight of the resultant, in present invention, was 600~30000 Da under microwave irradiation assisted acid solvent containing electrolyte. So, the present invention established an effectively technical road that chitosan became water-soluble chitosan.

2) The present invention can cut down energy consumption, decrease pollution and save time and raw materials. The molecular weight of chitosan was about $7\times10^5$ in 3~6 h for 100° C. by means of conventional heating assisted dilute hydrochloric acid. Compared with this result, microwave irradiation accelerated the degradation of chitosan. The molecular weight dramatically changed abruptly within several minutes.

3) The present invention can make chitosan oligosaccharides large-scale application in our society. For example, as health food they can improve health of the human being and increase body immunity. Moreover, because of high yield they can be lower price and bring benefit to the people. It should be a potential application technique to perspective of industry and extensive market.

Principle of the Present Invention:

Microwave heating is occurred within the molecules and does not change inner structure of molecules, so it is described as "inside heating". Microwave irradiation induces changed particles to migrate or rotate and results in molecular movement among the reactant. Moreover, because of catalytic effect of hydrogen ion in acid solvent and the solubility of chitosan and degradation rate are significantly increased. The experiment showed that under microwave irradiation, molecular weight of the resultant obtained using acetic acid as solvent was higher than that of the resultant obtained using hydrochloric acid as solvent. It may be that dissociated velocity of HAc was considerably lower than that of HCl. In reaction that microwave irradiation degraded chitosan, after the electrolyte was added to the system, the presence of salts can enhance microwave coupling of the solvents. Consequently, superheating effects can be magnified. Moreover, microwave irradiation can increased motion of polar molecules and improve collision frequency of the reactant, so in acid system of quite low concentration, additional metal salts can significantly increase the reaction rate. The test showed that salt effect can not destroyed structure of pyranosyl rings and distinctly increases the reaction rate and selectivity in reaction that microwave irradiation degraded chitosan. Therefore, the degraded reaction can thus be completed in a short time in the presence of electrolyte under microwave irradiation.

DESCRIPTION OF THE INVENTION IN DETAIL

Figure 1:
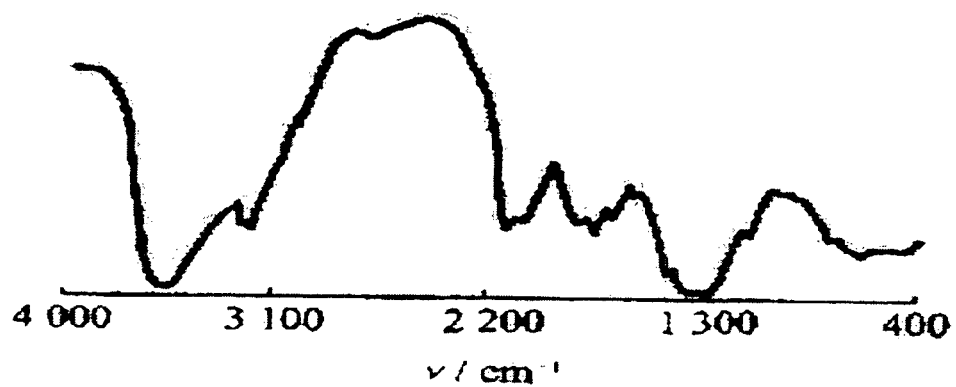
FIG. 1 is a FTIR spectrum of chitosan.
Figure 2:
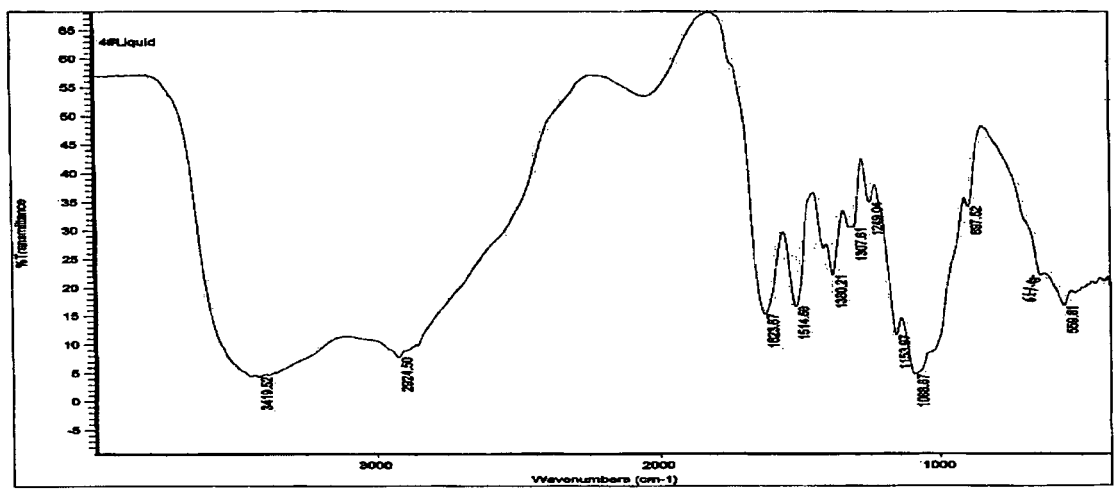
FIG. 2 is a FTIR spectrum of low molecular weight chitosan oligosaccharides obtained under acid solvent containing NaCl.

The present invention will now be described with reference to attached drawings and the following examples. However, protective range of the present invention did not only confine the following examples.

EXAMPLES

Technical method of the present invention that chitosan oligosaccharides was prepared by means of microwave irradiation assisted electrolyte is described as follows:

8~30 times acid solvent or acid solvent containing electrolyte of ionic strength 0.01~0.1 (state electrolyte added to quantitative dilute acid of 2% or other concentration and became dilute electrolyte solution of 0.1 M or other mol concentration) was added to 0.1~3 g chitosan (1~3 examples: 0.1 g, 5~6 examples: 1 g, 9~11 examples: 2 g, 12~15 examples: 3 g, 17~19 examples: 2.5 g). The reaction mixture was stirred and dissolved to viscous fluid. The reactor containing the mixture of reactant was placed on the center of the turntable of the microwave oven at 480 W, 640 W and 800 W for 3 min, 6 min, 9 min and 12 min, respectively. After irradiation ceased, the reaction liquid was cooled to room temperature. Then the solution was adjusted to neutrality with 1~10 M NaOH, KOH or ammonia water and obtained the pale yellow floc. (NaOH was used by examples 1~3, 17~19, KOH was used by examples of 5~6, ammonia water was used by examples of 9~15) The floc settled beyond 30 min at 1~10° C. in cold closet. The mixture of products was filtered and the precipitate was desiccated at 50~70° C. Dried products were crushed to 20~100 mesh and assayed the molecular weight of chitosan oligosaccharides by Ubbelohde viscometer (classical method of determining molecular weight). Exact parameter of preparation was showed in following tables 1~8.

TABLE 1 chitosan oligosaccharides was influenced by different dose electrolyte acid solution (HCl as an example)

| | Solvent dose | | | | |
|---|---|---|---|---|---|
| | 8 | 15 | 20 | 25 | 30 |
| Phenomenon | Big viscosity | A little big viscosity | Proper viscosity | Proper viscosity | Proper viscosity |
| Resultant color | Dark yellow | Dark yellow | Yellow | Yellow | Pale yellow |

TABLE 2 yield of chitosan oligosaccharides was influenced by different precipitate time (HCl as an example for 2 min)

| | Precipitate time (min) | | | | |
|---|---|---|---|---|---|
| | 30 | 60 | 120 | 180 | 240 |
| Yield (%) | 89.72 | 89.95 | 89.23 | 88.97 | 89.98 |

TABLE 3 color of chitosan oligosaccharides was influenced by different
kiln dried temperature (HCl as an example for 2 min)

| | Temperature (° C.) | | |
|---|---|---|---|
| | 50 | 60 | 70 |
| Color of the resultant | Pale yellow | Pale yellow | Yellow |
| Kiln dried time (h) | 8 | 7 | 5 |

TABLE 4 the degraded resultant of chitosan was influenced by
different acid concentration (HCl as an example)

| | Acid concentration (%) | | | | |
|---|---|---|---|---|---|
| | 0.5 | 1 | 2 | 3 | 4 |
| Dissolved velocity | Slow | A little slow | proper | proper | A little slow |
| Dose of solvent | more | much | proper | proper | A little |

TABLE 5 molecular weight of the resultant for 3~12 min at 480 W

| Example | acid solvent | time (min) | | | |
|---|---|---|---|---|---|
| | | 3 | 6 | 9 | 12 |
| 1 | 0.1M NaCl + 2% HCl | $2.01 \times 10^4$ | $1.92 \times 10^4$ | $1.69 \times 10^4$ | $1.17 \times 10^4$ |
| 2 | 0.1M KCl + 2% HCl | $1.87 \times 10^4$ | $1.76 \times 10^4$ | $1.43 \times 10^4$ | $1.01 \times 10^4$ |
| 3 | 0.05M CaCl$_2$ + 2% HCl | $1.65 \times 10^4$ | $1.57 \times 10^4$ | $1.24 \times 10^4$ | $9.28 \times 10^3$ |
| 4 | 2% HAc (comparing example) | $4.74 \times 10^5$ | $4.52 \times 10^5$ | $4.27 \times 10^5$ | $3.79 \times 10^5$ |
| 5 | 0.1M NaCl + 2% HAc | $2.23 \times 10^4$ | $2.09 \times 10^4$ | $1.83 \times 10^4$ | $1.42 \times 10^4$ |
| 6 | 0.1M KCl + 2% HAc | $1.97 \times 10^4$ | $1.88 \times 10^4$ | $1.69 \times 10^4$ | $1.31 \times 10^4$ |
| 7 | 0.05M CaCl$_2$ + 2% HAc | $1.73 \times 10^4$ | $1.64 \times 10^4$ | $1.38 \times 10^4$ | $1.04 \times 10^4$ |

TABLE 6 molecular weight of the resultant for 3~12 min at 640 W

| example | acid solvent | time (min) | | | |
|---|---|---|---|---|---|
| | | 3 | 6 | 9 | 12 |
| 8 | 2% HCl (Comparison) | $4.23 \times 10^5$ | $3.97 \times 10^5$ | $3.62 \times 10^5$ | $3.16 \times 10^5$ |
| 9 | 0.1M NaCl + 2% HCl | $1.94 \times 10^4$ | $1.76 \times 10^4$ | $1.45 \times 10^4$ | $1.02 \times 10^4$ |
| 10 | 0.1M KCl + 2% HCl | $1.69 \times 10^4$ | $1.52 \times 10^4$ | $1.21 \times 10^4$ | $9.13 \times 10^3$ |
| 11 | 0.05M CaCl$_2$ + 2% HCl | $1.51 \times 10^4$ | $1.43 \times 10^4$ | $1.12 \times 10^4$ | $8.97 \times 10^3$ |

TABLE 7 molecular weight of the resultant for 3~12 min at 800 W

| example | acid solvent | time (min) | | | |
|---|---|---|---|---|---|
| | | 3 | 6 | 9 | 12 |
| 12 | 2% HCl (Comparison) | $3.89 \times 10^5$ | $3.42 \times 10^5$ | $2.89 \times 10^5$ | $2.10 \times 10^5$ |
| 13 | 0.1M NaCl + 2% HCl | $1.72 \times 10^4$ | $1.43 \times 10^4$ | $1.14 \times 10^4$ | $9.14 \times 10^3$ |
| 14 | 0.1M KCl + 2% HCl | $1.49 \times 10^4$ | $1.13 \times 10^4$ | $8.73 \times 10^3$ | $7.92 \times 10^3$ |
| 15 | 0.05M CaCl$_2$ + 2% HCl | $1.37 \times 10^4$ | $1.03 \times 10^4$ | $8.01 \times 10^3$ | $6.79 \times 10^3$ |

TABLE 8 molecular weight of the resultant for
12 min at different microwave energy

| example | acid solvent | Microwave energy (W) | | |
|---|---|---|---|---|
| | | 480 | 640 | 800 |
| 16 | 2% HCl (Comparison) | $3.41 \times 10^5$ | $3.16 \times 10^5$ | $2.10 \times 10^5$ |
| 17 | 0.1M NaCl + 2% HCl | $1.17 \times 10^4$ | $1.02 \times 10^4$ | $9.14 \times 10^3$ |
| 18 | 0.1M KCl + 2% HCl | $1.01 \times 10^4$ | $9.13 \times 10^3$ | $7.92 \times 10^3$ |
| 19 | 0.05M CaCl$_2$ + 2% HCl | $9.28 \times 10^3$ | $8.97 \times 10^3$ | $6.79 \times 10^3$ |

Under microwave irradiation assisted the electrolyte, spectrogram analysis of the present invention is as follows.

In the FTIR spectrum (as shown in FIG. 1~5), characteristic absorption peak of chitosan and chitosan oligosaccharides at about 3410 cm$^{-1}$ ($v_{O-H}$ and $v_{N-H}$), 2924 cm$^{-1}$ ($v_{C-H}$), 1623, 1513 cm$^{-1}$ ($\delta_{N-H}$), 1088 cm$^{-1}$ ($v_{C-N}$) (Because of strong peak, it was not absorption peak of C—C), 651 cm$^{-1}$ ($\delta_{NH2}$), 1380 cm$^{-1}$ ($\delta_{C-H}$), 1248 cm$^{-1}$ ($\delta_{O-H}$), 1153 cm$^{-1}$ ($\delta_{C-O-C}$) and 895 cm$^{-1}$ (β-$\delta_{C-H}$) could be easily observed. Moreover, the peak at 895 cm$^{-1}$, due to the end group epimeric β-$\delta_{C-H}$, proved that the cyclic pyranosyl rings were not destroyed by microwave irradiation. At the same time, the peak at 651 cm$^{-1}$, due to amino groups, proved that the amino groups also are not destroyed by microwave irradiation. Furthermore, as shown in FIG. 1~5, salt effect does not influence the structure of pyranosyl rings. Salt effect is that adding strong electrolyte without the same ion with soft electrolyte to soft electrolyte and making dissociated velocity of soft electrolyte increase. After the strong electrolyte was added to the solution, the effect of interionic condition each other was increased and the chance that ion combine to become molecule was decreased. So, when the reaction gets to equilibrium, dissociated velocity of soft electrolyte was stronger than that without additional strong electrolyte. In this invention, chitosan is soft electrolyte and the inorganic salt such as NaCl is strong electrolyte. Inorganic salt improved dissociated velocity of chitosan (but soft electrolyte). FTIR spectrum showed that the same spectrogram were observed to chitosan and chitosan oligosaccharides, this result also proved that the cyclic pyranosyl rings are not destroyed by microwave irradiation. Moreover, FTIR spectrum of chitosan oligosaccharides showed that different electrolyte and different ionic strength did not influence the structure of chitosan oligosaccharides.

Figure 6:
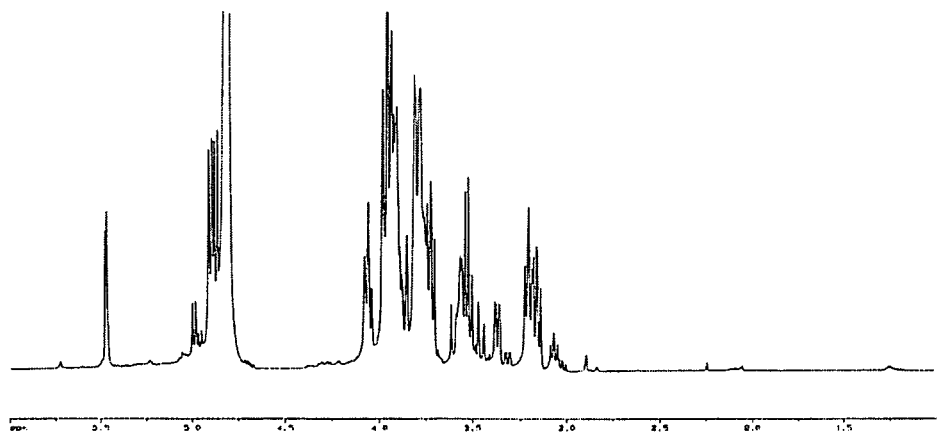
FIG. 6 is a $^1H$ NMR spectrum of low molecular weight chitosan oligosaccharides.
Figure 3:
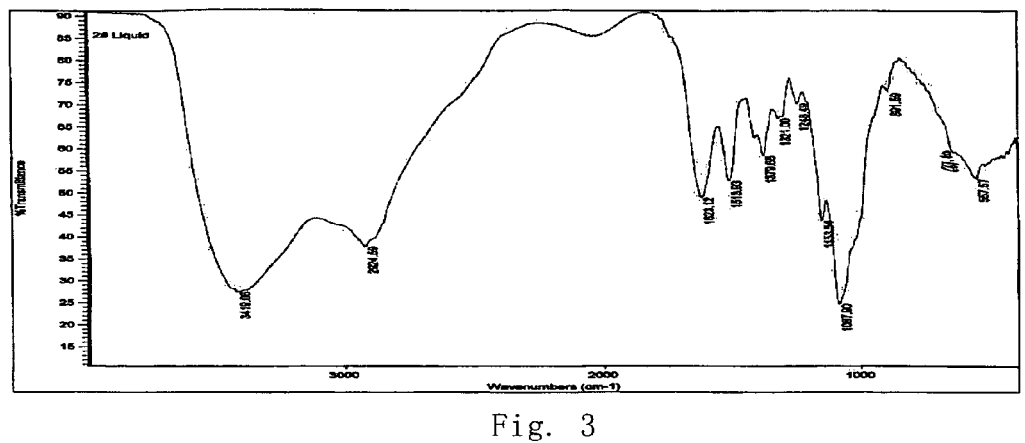
FIG. 3 is a FTIR spectrum of low molecular weight chitosan oligosaccharides obtained under acid solvent containing KCl.
Figure 4:
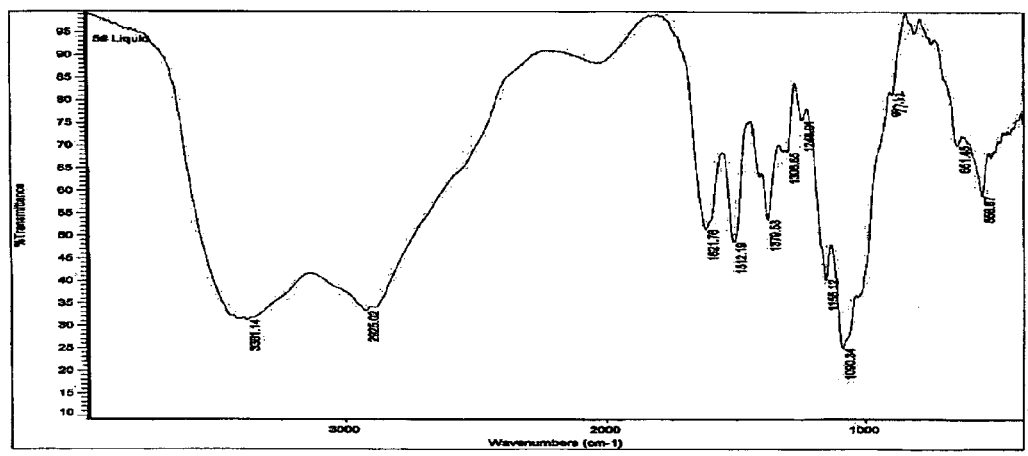
FIG. 4 is a FTIR spectrum of low molecular weight chitosan oligosaccharides obtained under acid solvent containing $CaCl_2$.
Figure 5:
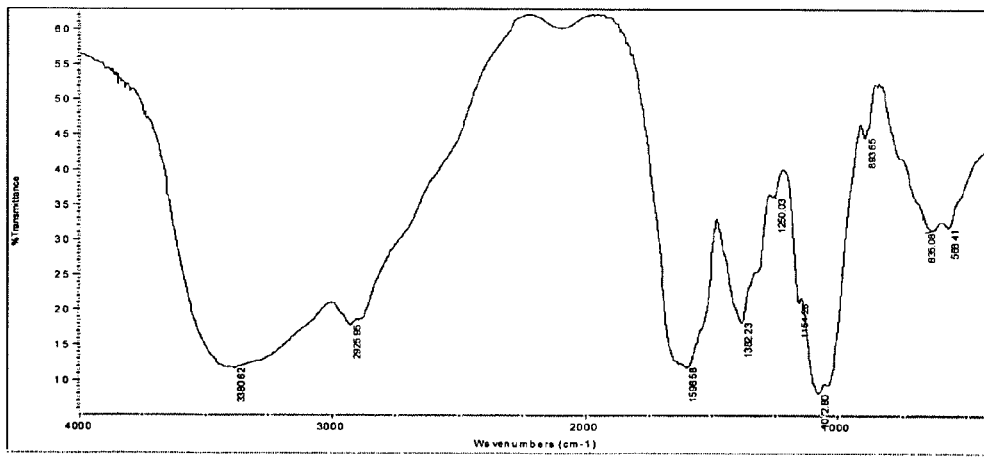
FIG. 5 is a FTIR spectrum of low molecular weight chitosan oligosaccharides obtained under pure acid solvent.

In the $^1$H NMR spectrum (as shown in FIG. 6), the signals at 2.04 ppm was due to the CH$_3$ residue on the acetamide group and the resonances of H$_2$-H$_6$ occurred in the range 3.2~4.2 ppm. Hydrogen chemical shifts of chitosan oligosaccharides was shown in table 9.

TABLE 9

<sup>1</sup>H NMR chemical shifts for chitosan oligosaccharides

| $H_1$ | $H_2$ | $H_3$ | $H_4$ | $H_5$ | $H_{6a}$ | $H_{6b}$ |
|---|---|---|---|---|---|---|
| 5.49 | 3.76 | 4.13 | 3.98 | 3.87 | 3.23 | 3.29 |

Figure 7:
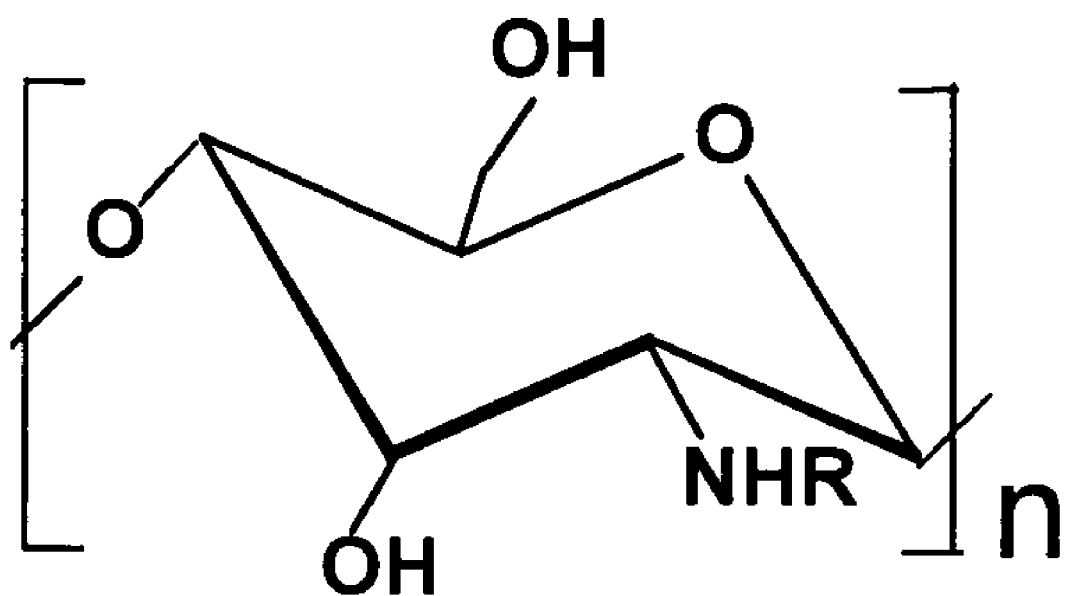
FIG. 7 is a characteristic structure of chitosan oligosaccharides.

The structure of the resultant was shown in FIG. 7.

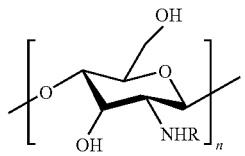

Wherein n=3~150 (degree of polymerization), R=H and/Ac, Mv=600~30000 Da.

Example 20

Example 20 is different from example 1. It applied citric acid (4%) and molecular weight of the resultant was $1.17 \times 10^4$ Da.

For all examples, settling time and settling temperature (1~10° C.) did not influence quality of the products.

For all examples, reaction was carried out with 2 g of chitosan, 60 mL of electrolyte acid solvent.

Dilute acid of the present invention also may be formic acid, tartaric acid, phosphoric acid and electrolyte also may be $FeCl_3$ and so on.

What is claimed:

1. A method for the preparation of low molecular weight chitosan oligosaccharides, which comprises:
   1) quantitatively weighing chitosan powder,
   2) adding an electrolyte solution to the chitosan powder to obtain a chitosan:electrolyte solvent (W/V) ratio=1: 8~30, wherein the electrolyte solution comprises a salt and an acid in solution,
   3) stirring the solution to uniformity, then subjecting the solution to microwave irradiation,
   4) adjusting the solution to neutrality with 1~10 M NaOH, KOH or ammonia water to obtain a pale yellow floc and then settling the floc at least 30 minutes at 1~10° C. in a cold closet,
   5) filtering the pale yellow floc to obtain a precipitate and then desiccating the precipitate at 50~70° C. to obtain a dried product,
   6) crushing the dried product to 20~100 mesh and assaying the molecular weight of chitosan oligosaccharides, and taking chitosan oligosaccharides having a molecular weight of 600~30000 Da as the finished product.

2. The method according to claim 1, wherein the salt is NaCl, KCl, $CaCl_2$ or $FeCl_3$.

3. The method according to claim 1, wherein the ionic strength of electrolyte solution is 0.01~0.1.

4. The method according to claim 1, wherein the acid is hydrochloric acid, acetic acid, citric acid, tartaric acid, formic acid, and wherein the concentration of tartaric acid and citric acid is 0.5~4% (W/V), and the concentration of hydrochloric acid, acetic acid and formic acid is 0.5~4% (V/V).

5. The method according to claim 1, wherein the microwave energy is 480~800 W.

6. The method according to claim 1, wherein the microwave irradiation time is 1~12 minutes.

7. The method according to claim 1, 5 or 6, wherein the molecular weight of the chitosan oligosaccharides obtained from the electrolyte solution comprising NaCl ranges from $2.5 \times 10^4$~$9.14 \times 10^3$ Da.

8. The method according to claim 1, 5 or 6, wherein the molecular weight of the chitosan oligosaccharides obtained from the electrolyte solution comprising KCl ranges from $2.0 \times 10^4$~$6.02 \times 10^2$ Da.

9. The method according to claim 1, 5 or 6, wherein the molecular weight of the chitosan oligosaccharides obtained from the electrolyte solution comprising $CaCl_2$ ranges from $1.8 \times 10^4$~$4.79 \times 10^2$ Da.

10. A method for the preparation of low molecular weight chitosan oligosaccharides, which comprises:
   exposing an electrolyte solution containing a salt and an acid in solution and chitosan to microwave irradiation, wherein the acid is selected from the group consisting of: 0.5~4% (V/V) hydrochloric acid, 0.5~4% (V/V) acetic acid, 0.5~4% (W/V) citric acid, 0.5~4% (W/V) tartaric acid, and 0.5~4% (V/V) formic acid.

* * * * *